Nov. 18, 1952                E. BOWEN                2,618,066
FOOT MEASURING DEVICE
Filed Nov. 22, 1950                                2 SHEETS—SHEET 1

INVENTOR
EDWARD BOWEN
BY Marshall and Marshall
ATTORNEYS

Nov. 18, 1952     E. BOWEN     2,618,066
FOOT MEASURING DEVICE

Filed Nov. 22, 1950     2 SHEETS—SHEET 2

INVENTOR
EDWARD BOWEN
BY Marshall and Marshall
ATTORNEYS

Patented Nov. 18, 1952

2,618,066

UNITED STATES PATENT OFFICE 2,618,066

FOOT MEASURING DEVICE

Edward Bowen, Kings Norton, Birmingham, England

Application November 22, 1950, Serial No. 196,988
In Great Britain December 1, 1949

4 Claims. (Cl. 33—3)

This invention has reference to improvements in foot measuring devices. It is well known that shoes and boots are manufactured in sizes which are dependent upon the length and width of foot which they are required to fit and that the indicia representing the width fittings are the same for varying lengths of shoe although the actual widths of different lengths of shoe bearing the same width indicium vary. That is to say if the length size are indicated by numerals and the width sizes by letters then a size 9E shoe is of a different width from a size 8E shoe. In devices for foot measuring as at present in use it is necessary in order to ascertain the correct width fitting, first to set manually the length size on a scale or the like before a correct reading of the width sizes can be obtained. The present invention has for its object to overcome this disadvantage by providing a device which after adjustment to the foot being measured gives an automatic indication of the length and width sizes in juxtaposition. More particularly in the United States of America, shoes and boots are graded in sizes which are dependent, not only upon the length and width, but also upon the distance between the heel and the ball of the foot they are required to fit and according to the present invention provision is made for such a size reading being obtained automatically in co-relation to the length and width sizes.

The invention consists of a foot measuring device characterised in that movement of a length measuring slide effects a rotational setting of a drum to provide an indication of length whilst transverse movement of a width measuring slide effects a setting of a scale or index relative to the drum to provide a co-related indication of width. The invention further resides in details of construction to be described hereinafter and in the provision of a rotatable indicator combined with the drum whereby a differentially related reading can be obtained to give an indication of the length from heel to ball of the foot being measured.

Embodiments of the present invention will now be described by way of example and with reference to the accompanying drawings in which.

Figure 1:
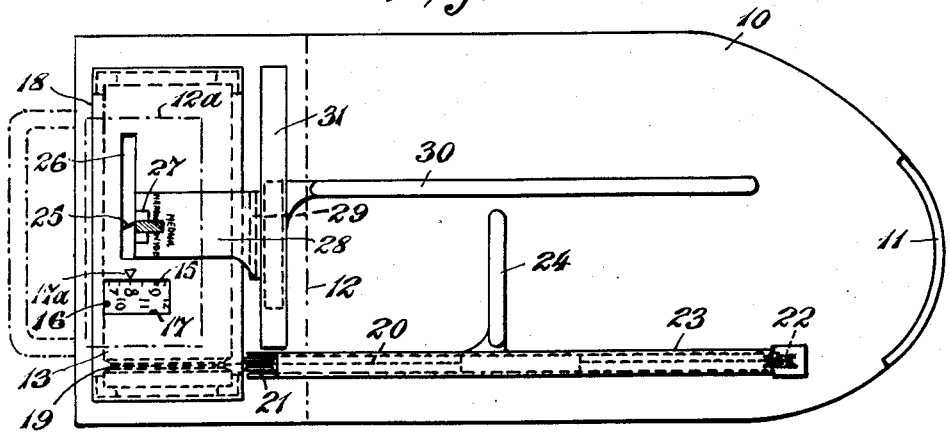
Fig. 1 is a plan of a foot measuring device in accordance with the present invention.
Figure 2:
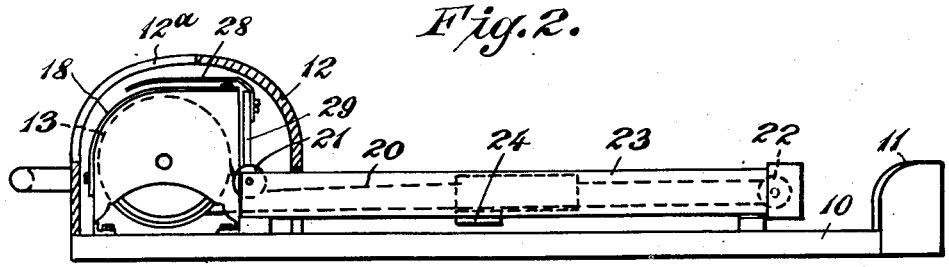
Fig. 2 is a part sectional side elevation of the device seen in Fig. 1.
Figure 3:
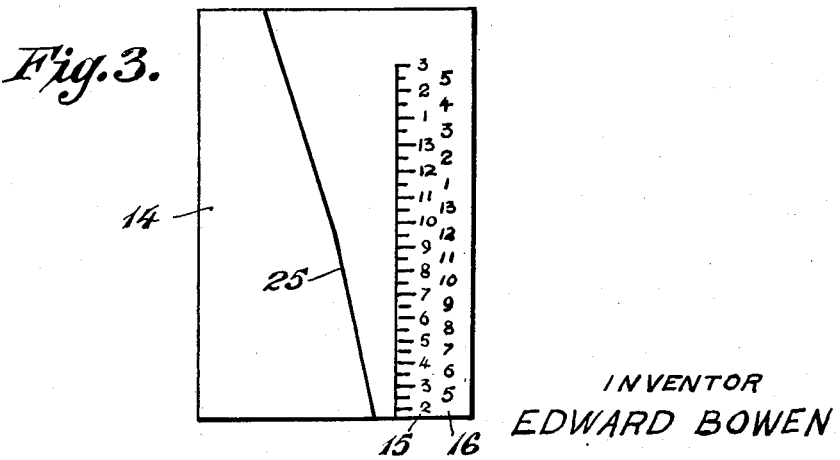
Fig. 3 is a view of the chart before attachment to the drum of the device seen in Figs. 1 and 2.

Referring first to the construction shown in Figs. 1–3 which may be said to illustrate the invention in simple form there is provided a base plate 10 upon which the foot to be measured is adapted to be placed with the heel in contact with an upstanding heel plate 11. Mounted on the platform 10 at the end remote from the heel plate 11 is a housing 12 having a window 12a. Within the housing 12 is mounted a rotatable drum indicator 13 carrying on its periphery a chart 14 (see Fig. 3) bearing length scales 15 and 16 which can be viewed through the window 12a and through an aperture 17 in a masking plate 18 and can be read in relation to a fixed index 17a adjacent the aperture; the scale 15 representing sizes of foot whilst the scale 16 represents sizes of shoe or boot. The drum 13 is provided at one end with a pulley 19 around which passes a cable 20 passing beneath a pulley 21 and around an idle pulley 22 located remote from the housing 12 in a tunnel 23 extending longitudinally of the base plate 10 and disposed to one side thereof. Connected to the run of the cable 20 and projecting through a slot in the side of the tunnel 23 is a slide 24 which is adapted to be slid longitudinally above the upper face of the base plate 10 into engagement with the toe of the foot on the platform and thereby effect a rotational setting of the drum indicator 13.

The chart 14 also carries an index line 25 which when the chart is wrapped around and secured to the periphery of the drum 13 is helically disposed. A small portion of this index line 25 is visible through a slot 26 in the masking plate 18 and forms an index against which a scale 27 on a plate 28 can be read. The plate 28 is connected by a bracket 29 to a slide 30 which is capable of being slid in a guide 31 transversely over the face of the base plate 10.

This foot measuring device is used in the following manner:

The foot to be measured is placed upon the base plate 10 with the heel in contact with the heel plate 11 and the one side of the foot in contact with the tunnel 23. The slide 24 is then moved into contact with the toe of the foot thereby effecting a rotational setting of the drum indicator 13. The slide 30 is then moved into register with the side of the foot opposite to that side in contact with the tunnel 23 thus effecting a sliding of the plate 28 longitudinally over the face of the drum indicator 13 and parallel to the axis thereof. It will be appreciated that the length and width size of shoe required can then both be read through the window 12a in the housing 12.

Figure 4:
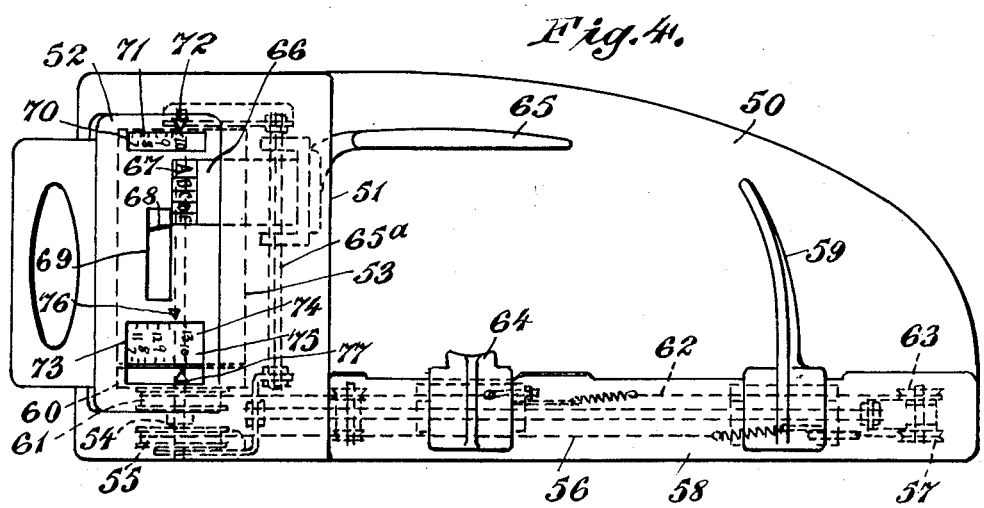
Fig. 4 is a plan of an alternative construction to that seen in Fig. 1 having provision for additional measurements and Fig. 5 is a side elevation of the mechanism seen in Fig. 4.
Figure 5:
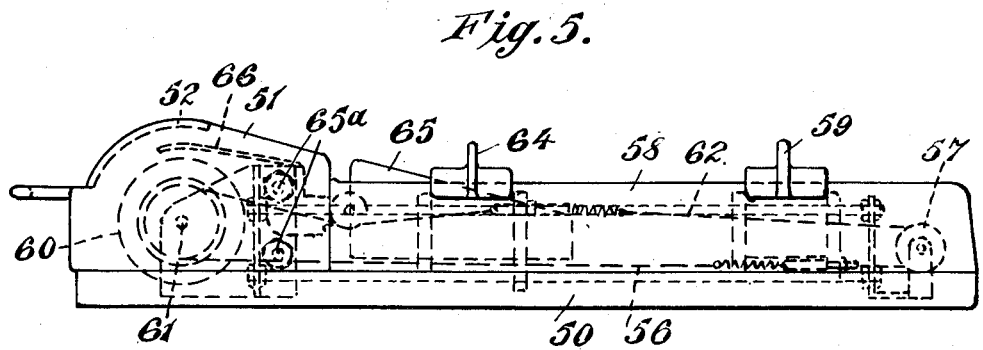

Referring now to the embodiment of the invention shown in Figs. 4 and 5 there is provided a base plate 50 provided at one end with a housing 51 having a window 52. Within the housing 51 is rotatably mounted a drum indicator 53 which is fixedly mounted upon a spindle 54 carrying a pulley 55 around which is passed an endless cable 56 which passes around an idle pulley 57 disposed in a tunnel 58 at the end remote from the housing 51; the tunnel 58 being, as in the earlier construction, disposed at one side of the base plate 50. Attached to one run of the cable 56 is an arm 59 which projects through a slot in the tunnel 58 and can be slid longitudinally over the face of the base plate 50 to engage the heel of a foot in a manner to be more fully described hereinafter. Rotatably mounted on the spindle 54 is a sleeve on which is mounted a subsidiary drum 60 and a pulley 61 around which passes an endless cable 62 which passes around an idle pulley 63 in the tunnel 58 at the end remote from the housing 51. Connected to this cable 62 through the slot in the tunnel is a block 64 which is adapted to be slid longitudinally relative to the base plate 50 so as to register with the ball of the foot to be measured. A slide 65 adapted to be slid laterally over the face of the base plate 50 on a guide rail 65ᵃ is connected to a plate 66 which carries a scale 67 of width-size indicia. This scale 67 is adapted to be read in conjunction with a portion of a helically disposed index line 68 on the drum indicator 53 which is visible through a slot 69 in a masking plate disposed beneath the window 52 of the housing 51. This masking plate has an aperture 70 through which is visible a scale 71 representing length sizes such as are at present used in Great Britain, which scale can be read in conjunction with a fixed index 72. The masking plate is also provided with an aperture 73 through which can be viewed a portion of the scales 74 and 75 on the peripheries of the drum indicator 53. The scale 74 represents length sizes such as are at present in use in the United States of America and this scale can be read in conjunction with the fixed index 76 whilst the scale 75 represents sizes dependent upon the length of foot from heel to ball of the foot. This scale 75 is adapted to be read in conjunction with an index 77 on the periphery of the subsidiary drum 60.

This measuring device is adapted to be used in the following manner:

The foot to be measured is placed upon the base plate 50 with the toe contacting the housing 51. The arm 59 is then slid into contact with the heel of the foot, which movement will effect a rotational setting of the drum indicator 53. The block 64 is then slid into a position in which it registers with the ball of the foot being measured and this movement will effect a rotational setting of the subsidiary drum 60. The arm 65 is then moved into contact with the side of the foot opposite to that in contact with the block 64 so as to effect a setting of the scale 67 relative to that portion of the index 68 visible through the window 69. When these settings have been effected, then it will be appreciated that on looking through the window 52 an immediate indication is given of the size of shoe or boot required as determined by the length, width and length of foot from heel to ball.

It will be appreciated that the width scale can be provided on the periphery of the drum indicator, in which case it may take the form of a plurality of differently coloured bands arranged helically around the periphery of the drum and a fixed index may be provided on the plate 66 against which this scale could be read.

I claim:

1. In a foot measuring device, in combination, a base plate having a foot receiving surface, a track extending along a side of the foot receiving surface of the base, a housing erected on the base and extending transversely to the track, a drum chart rotatably mounted in the housing, a heel receiving member, a toe receiving member, each of said members extending transversely to said track with one of the members fixed to the base and the other mounted on the track for movement therealong, cable guide means at each end of the track, a cable drivingly connecting the movable member to the drum chart, said cable being guided over said guide means on the track, a second track extending transversely to the first track and adjacent the drum chart, and a width responsive member mounted on the track, said width member having indicia that cooperates with a helical index line on said drum chart to indicate the width size of the foot being measured.

2. A device according to claim 1, in which the track is covered and cable housed therein.

3. In a foot measuring device, in combination, a base plate having a foot receiving surface, a covered track on the plate extending along a side of the receiving surface and defining a reference surface for the measurement of width, a housing mounted at one end of the foot receiving surface and extending transversely to the covered track, a heel receiving surface erected from the base at the end of foot receiving surface remote from the housing, a first member slidably mounted on and extending transversely to the track adapted to contact the toe of a foot positioned on the surface, a second track on the base extending transversely to the first track and adjacent the housing, a drum chart mounted in the housing, a width responsive member slidably mounted on the second track, said width member having an index portion adjacent the periphery of the drum chart, drive means in the covered track for operatively connecting the first member to the chart, said drive means comprising a cable loop attached to the chart and extending along the covered track with one portion thereof attached to the first member, said index portion and said chart having indicia for indicating the width size of the foot being measured.

4. In a foot measuring device, in combination, a base plate having a foot receiving surface, a covered track on the base extending along one side of the receiving surface, a housing extending along an end of the surface, said covered track and housing providing reference surfaces to engage the side and toe respectively of a foot being measured, a heel engaging slide mounted on the covered track, a track in the housing, a width measuring slide mounted on the housing track, a drive chart rotatably mounted in the housing, a cable carried over guide means at the ends of the covered track and connected to the heel slide and to the drum chart for rotating the drum chart, an auxiliary slide mounted on the covered track, a second drum chart, a second cable carried over guide means at the ends of the covered track for connecting the second drum chart to the auxiliary slide, and cooperating indicia on said width slide and said charts for indicating the size of a foot engaged with said slides and said reference surfaces.

EDWARD BOWEN.

REFERENCES CITED

The following references are of record in the file of this patent:

UNITED STATES PATENTS

| Number | Name | Date |
|---|---|---|
| 1,261,459 | Thalimer | Apr. 2, 1918 |
| 2,146,799 | Davis | Feb. 14, 1939 |